United States Patent
Zhou et al.

(10) Patent No.: US 11,248,085 B2
(45) Date of Patent: Feb. 15, 2022

(54) EPOXY RESIN MATERIAL, PREPARATION METHOD THEREFOR AND APPLICATION THEREOF

(71) Applicant: Wanhua Chemical Group Co., Ltd., Shandong (CN)

(72) Inventors: Meng Zhou, Shandong (CN); Zhaoxing Liu, Shandong (CN); Xiucai Du, Shandong (CN); Xiaoli Sun, Shandong (CN); Changkun Chu, Shandong (CN); Congying Zhang, Shandong (CN); Xin Li, Shandong (CN); Qingmei Jiang, Shandong (CN)

(73) Assignee: Wanhua Chemical Group Co., Ltd.

( * ) Notice: Subject to any disclaimer, the term of this patent is extended or adjusted under 35 U.S.C. 154(b) by 0 days.

(21) Appl. No.: 16/644,798

(22) PCT Filed: Sep. 28, 2017

(86) PCT No.: PCT/CN2017/103949
§ 371 (c)(1),
(2) Date: Mar. 5, 2020

(87) PCT Pub. No.: WO2019/051885
PCT Pub. Date: Mar. 21, 2019

(65) Prior Publication Data
US 2021/0047459 A1    Feb. 18, 2021

(30) Foreign Application Priority Data
Sep. 15, 2017 (CN) .......................... 201710835482.6

(51) Int. Cl.
*C08G 59/24* (2006.01)
*C08G 59/50* (2006.01)
*C08G 59/56* (2006.01)
*C08G 59/68* (2006.01)

(52) U.S. Cl.
CPC ....... *C08G 59/245* (2013.01); *C08G 59/5006* (2013.01); *C08G 59/5026* (2013.01); *C08G 59/5033* (2013.01); *C08G 59/56* (2013.01); *C08G 59/68* (2013.01)

(58) Field of Classification Search
CPC .............. C08G 59/245; C08G 59/5006; C08G 59/5026; C08G 59/5033; C08G 59/56; C08G 59/68
USPC ........................................................ 525/523
See application file for complete search history.

(56) References Cited

FOREIGN PATENT DOCUMENTS

| | | |
|---|---|---|
| CN | 101418070 A | 4/2009 |
| CN | 101805442 A | 8/2010 |
| CN | 102924693 A | 2/2013 |
| CN | 103524717 A | 1/2014 |
| CN | 102746621 B | 5/2015 |
| CN | 104610529 A | 5/2015 |
| CN | 105566854 A | 5/2016 |
| CN | 105567144 A | 5/2016 |
| CN | 106380785 A | 2/2017 |
| JP | S5993721 A | 5/1984 |

OTHER PUBLICATIONS

Byk, https://www.byk.com/en/product/defoamers-and-air-release-additives, accessed May 19, 2021 (Year: 2021).*
Chinese Search Report for Application No. CN 201710835482.6 dated Aug. 30, 2019, 2 pages.
International Search Report from Application No. PCT/CN2017/103949 dated Jun. 20, 2018, 2 pages.
Extended European Search Report including Written Opinion for EP17925438.8 dated May 17, 2021; 6 pages.

* cited by examiner

*Primary Examiner* — David T Karst
(74) *Attorney, Agent, or Firm* — Lerner, David, Littenberg, Krumholz & Mentlik, LLP

(57) ABSTRACT

The present invention provides an epoxy resin material, a preparation method therefor and an application thereof. The present method for preparing an epoxy resin material comprises: heating a mixture of an epoxy resin main agent and a curing agent that are placed at room temperature to 40-85° C. for reaction and curing. The curing agent contains an adduct of an olefinic nitrile compound and an amine compound. The present method for preparing an epoxy resin material has the characteristics of low mixing viscosity, long operation time, and low amount of heat released during preparation.

19 Claims, No Drawings

EPOXY RESIN MATERIAL, PREPARATION METHOD THEREFOR AND APPLICATION THEREOF

CROSS REFERENCE TO RELATED APPLICATIONS

The present application is a national phase entry under 35 U.S.C. § 371 of International Application No. PCT/CN2017/103949, filed Sep. 28, 2017, which claims priority from Chinese Patent Application No. 201710835482.6 filed Sep. 15, 2017, all of which are hereby incorporated herein by reference.

TECHNICAL FIELD

The present invention relates to an epoxy resin material and a preparation method therefor and an application thereof, and further relates to an epoxy resin material which can be applied to the preparation of large-scale composite materials such as wind power blades.

BACKGROUND OF ART

Wind power generation is a renewable and clean energy source which has been a mature technology and widely used. Large-scale composite material wind power blades, as an important part of wind turbine generator system, play a role in converting wind energy into electrical energy. The design and material selection of wind power blades determine the performance and power of a wind turbine generator. Due to its excellent mechanical properties, heat resistance, chemical resistance and good fatigue resistance, the application of epoxy resin in wind power blades has been continuously expanded. It is understood that currently, the mainstream wind power blades on the market are generally produced by using epoxy composite materials.

In recent years, with the rapid development of wind power industry in China, high quality onshore wind field has been decreasing. In order to further improve the utilization efficiency of wind energy, many wind fields with low wind speed and offshore wind fields have become the focus of future development of wind power industry. Therefore, wind power companies have put forward new requirements for wind turbine generator system with high-power single-unit installed capacity. This means that the length of wind power blades will be increased further. As a result, the performance requirements for materials for the preparation of wind power blades have also been raised to a new height. How to develop an epoxy resin material with advantages of low exotherm, low viscosity, long pot life, high heat resistance, good mechanical properties, and good compatibility with fibers, etc., has become one of the urgent needs of wind power industry.

Currently, the common amine curing agent used in epoxy resin materials which are applied to wind power blades, has a short operation time after being mixed with a resin due to its high activity, so it cannot flow fully in the mold during the preparation of composite materials. If a latent curing agent having low reactivity is used, due to its high post-curing temperature, the cured product has poor mechanical properties and thereby cannot be used for the preparation of large-scale wind power blades. At present, methods for reducing the activity of the curing agent in an epoxy resin composition mainly include modifying an epoxy compound, modifying an organosilicone, and microencapsulation. Among them, the modifying an epoxy compound is mainly carried out by reacting an epoxy diluent of low-viscosity with a polyamine to reduce the concentration of free amine in the curing agent; and the reactivity is reduced due to the increase of steric hindrance after connecting multiple groups to the polyamine. However, the viscosity of the curing agent, wherein the epoxy compound is modified, is high, and the degree of activity reduction is small, and the operation time of the mixed system cannot meet the requirements of the molding process of large-scale wind power blades. The organosilicone-modified curing agent adjusts the activity of curing agent mainly by changing the kind and number of reactive groups on the curing agent or adjusting the length of the siloxane segment. However, due to a large number of alkoxy segments present in the organosilicone-modified curing agent, its heat resistance and material flexural modulus are limited. The epoxy curing agent with low activity is produced thought microencapsulation by emulsification-solvent evaporation method, wherein a polysulfone plastic is used as a wall material and a latent curing agent of imidazoles is used as a capsule core material. This kind of curing agent is not easy to release at normal temperature, and can be quickly cured by heated to a specified temperature during use. The curing agent coated by a microcapsule has poor compatibility with the epoxy resin, and requires a high post-curing temperature, and the cured product has low mechanical properties and heat resistance; thereby it is difficult to be applied industrially.

Currently, the epoxy resin material widely used in wind power blades is obtained by diluting a bisphenol A type epoxy resin with a diluent and then curing it using an amine curing agent. However, due to the need of adding a large amount of diluent to improve its processability, the volume shrinkage rate of the product after being cured is high, the mechanical properties of the cured resin are deteriorated, and the glass transition temperature Tg is lowered, resulting in adverse effects on the blade life. In addition, currently, in the preparation of epoxy composite materials, the commonly used curing procedure is to simply mix a curing agent and an epoxy resin main agent at room temperature, but the epoxy resin composite material obtained thereby is susceptible to defects in terms of mechanical properties, solvent resistance, and glass transition temperature, etc.

The Chinese patent application with a publication No. CN 106380785A discloses a vacuum infusion epoxy resin system used for wind power blades, wherein the epoxy resin material is obtained by mixing an epoxy resin main agent and a curing agent, using a bisphenol A type epoxy resin in combination with an epoxy diluent as the epoxy resin main agent, and using a polyether amine and an isophorone diamine in combination with a modified amine as the curing agent. According to introduction, this epoxy resin system can improve the maximum exothermic temperature and operable time. However, according to the test data disclosed, the obtained product are not satisfactory in the characteristics of glass transition temperature Tg, etc.

SUMMARY OF THE PRESENT INVENTION

In order to make up for the deficiencie(s) of the prior art, the present invention provides an epoxy resin material and a preparation method therefor and an application thereof; the epoxy resin material of the present invention, during its preparation, has the characteristics of low mixing viscosity, long operation time and low exotherm, etc.

In order to achieve the above purpose, the present invention adopts the following technical solutions:

The first aspect of the present invention provides a preparation method of an epoxy resin material, comprising the following step(s): heating a mixture placed at room temperature to 40-85° C. for reaction and curing, wherein said mixture comprises an epoxy resin main agent and a curing agent, and said curing agent comprises an adduct of an olefinic nitrile compound and an amine compound.

In the present invention, during the preparation of the epoxy resin material, after mixing the curing agent and the epoxy resin main agent, the active hydrogen in the amino group undergoes a ring-opening addition reaction with an epoxy group to form an N-hydrocarbyl cyanoguanidine; and the mixture is placed at room temperature; thereafter, the mixture is heated to a temperature of 40-85° C., and the cyano group in this system further undergoes an addition reaction with a hydroxyl group to form an amide bond structure, thereby improving heat resistance, solvent resistance and mechanical properties of the cured product.

In a preferred embodiment of the present invention, the mixture is heated to 50-80° C. to be reacted and cured. When the epoxy resin material is prepared by this preferred embodiment, the obtained product has better performance and shows superior solvent resistance, mechanical properties and Tg value.

In a more preferred embodiment, after said mixture is heated, the reaction is carried out for 3-7 h, more preferably 4-7 h.

In a further preferred embodiment, the mixture which is heated to 50-80° C. undergoes the reaction for 4-7 h, and the performance of the product prepared by this preferred embodiment can be further improved.

As a preferred specific embodiment, before the mixture is heated for reaction and curing, the mixture is placed at room temperature for 24 h or more, which is conducive to prepare a product with a better performance; the time length for placing the mixture at room temperature can be 24 hours, or it can be any length of time longer than 24 hours, and the extension of the time length for the placement has little impact on the performance of the product, however, considering the production efficiency, a longer placement time is usually not an option to be selected.

Preferably, in the present invention, the adduct of an olefinic nitrile compound and an amine compound comprises one or more of the compounds having the following structural formula (I):

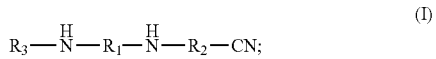

Wherein, the structural formula of $R_1$ in formula (I) is selected from one of the following formulas:

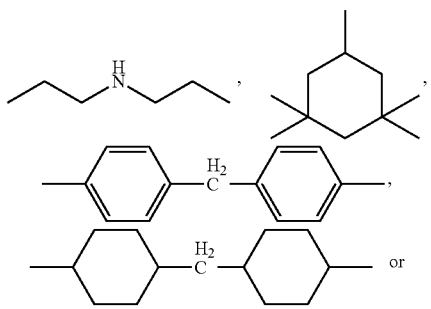

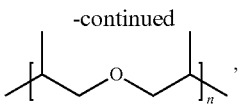

wherein the value of n is an integer from 1 to 6;

the structural formula of $R_2$ is selected from one of the following formulas:

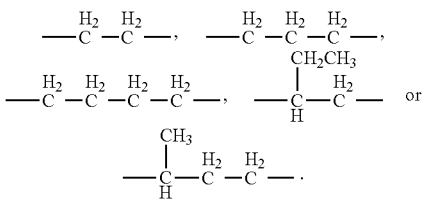

$R_3$ is selected from H or selected from one of the following structural formulas:

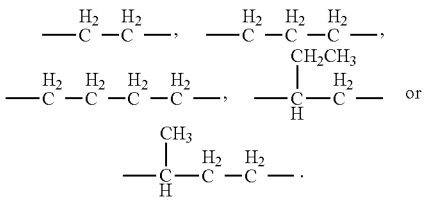

Using the preferred adduct of an olefinic nitrile compound and an amine compound can provide a longer operation time, a lower mixing viscosity, and a low exotherm in the preparation of the epoxy resin material. It is more conducive to obtain epoxy resin materials which are more excellent in mechanical properties, heat resistance and solvent resistance.

In a preferred embodiment of the present invention, the olefinic nitrile compound may specifically be one or more of acrylonitrile, 3-butenenitrile, 2-pentenenitrile, 3-pentenenitrile and 4-pentenenitrile, preferably acrylonitrile.

In a preferred embodiment of the present invention, the amine compound may specifically be one or more of diethylenetriamine, triethylenetetramine, polyether amine, 1,3-cyclohexyldimethylamine, isophorone diamine, 4,4'-diaminodicyclohexylmethane, diaminomethylcyclohexylmethane and diphenylmethanediamine, preferably isophorone diamine.

In a preferred embodiment of the present invention, the adduct is obtained by an addition reaction of the amine compound and the olefinic nitrile compound, wherein the molar ratio of the amine compound to the olefinic nitrile compound is 1:(1-4).

As a preferred embodiment of the present invention, the adduct of an olefinic nitrile compound and an amine compound is obtained by a method comprising the following steps: subjecting the amine compound and the olefinic nitrile compound to an addition reaction at 45-85° C., preferably the addition reaction is carried out at 55-75° C. Further preferably, after the amine compound is heated to 45-85° C., the olefinic nitrile compound is added in a dropwise manner. In the above preferred embodiment, the preparation process of the adduct of the olefinic nitrile compound and the amine compound is simple and practical, and the obtained adduct of the olefinic nitrile compound and the amine compound has a low viscosity. In a preferred embodiment, the amine compound and the olefinic nitrile compound are subjected to the addition reaction in a molar ratio of 1:(1-4).

In a preferred embodiment, the addition reaction is carried out for a period of 5-10 h, preferably 6-7 h.

In a preferred embodiment of the present invention, the addition reaction is carried out under the action of an alkaline catalyst, and the amount of the alkaline catalyst used is 0.01%-0.3% by mass of the amine compound, and more preferably 0.05%-0.2% by mass of the amine compound. The alkaline catalyst is preferably one or more of triethylamine, hexahydropyridine, sodium hydroxide, potassium hydroxide, sodium ethoxide, potassium tert-butoxide, sodium amide and quaternary ammonium hydroxides, and more preferably triethylamine.

In some preferred embodiments of the present invention, the olefinic nitrile compound has a purity of 50 wt % or more, preferably a purity of 50-80wt %, more preferably a purity of 65-75 wt %. The olefinic nitrile compound which achieves the above purity requirements can be obtained commercially. In some preferred embodiments of the present invention, the olefinic nitrile compound which achieves the above purity requirements can be obtained through purifying by a method comprising the following steps: distilling the olefinic nitrile compound under a vacuum degree of −0.5~−0.05 MPa, and at a temperature of 20~60° C.; and more preferably, the vacuum degree is −0.2~-0.09 MPa, and the temperature is 35~50° C.

As a preferred embodiment of the present invention, the mass ratio of the epoxy resin main agent to the curing agent is (3-8):1, preferably (3.5-7):1.

In a preferred embodiment of the present invention, the epoxy resin main agent comprises the following components in mass percentage: 60-80 wt % of epoxy resin, 2-20 wt % of diluent, and 1-20 wt % of defoamer, based on the mass of the epoxy resin main agent.

In the present invention, the epoxy resin is preferably one or more of a bisphenol A type epoxy resin and a bisphenol F type epoxy resin. Further preferably, the epoxy resin has an epoxy value of 0.1-0.65, and is a liquid at room temperature. More preferably, the epoxy resin is a bisphenol A type epoxy resin which has an epoxy value of 0.1-0.65 and is a liquid at room temperature. As an example, the epoxy resin may be one or more of E-44, E-51 and E-54, etc.

In the present invention, the diluent is preferably selected from one or more of butyl glycidyl ether, benzyl glycidyl ether, butanediol diglycidyl ether, 1,6-hexanediol diglycidyl ether, 1,2-cyclohexanediol diglycidyl ether, poly(ethylene glycol) diglycidyl ether, trimethylolpropane triglycidyl ether, glycidyl ether having a molecular main chain comprising a C12-C14 alkyl, benzyl alcohol, phenylethanol, nonylphenol, propylene carbonate, trimethylolpropane triacrylate, diisopropanol methyl ether, toluene and xylene.

In the present invention, the defoamer is preferably selected from one or more of a polyacrylate and a modified organosilicon. As an example, the defoamer may specifically be one or more of BYK066N, BYKA530, BYK141 and BYK354, manufactured by BYK-Chemie.

In a preferred embodiment of the present invention, the curing agent comprises 55-75 wt % of the adduct of an olefinic nitrile compound and an amine compound, based on the total mass of the curing agent. In a more preferred embodiment, the curing agent comprises the following components in mass percent: 55-75 wt % of the adduct of an olefinic nitrile compound and an amine compound, and 25-45 wt % of polyether amine, based on the total mass of the curing agent. As an example, the polyether amine may be one or more of D230, D400, D2000, T403 and T5000, preferably D230.

In order to facilitate the understanding of the preparation principle of the epoxy resin material in the present invention, the main reaction process of the preparation of the epoxy resin material will be described below by an example, in which the curing agent comprises the adduct of an acrylonitrile and an isophorone diamine, and the epoxy resin main agent mainly comprises an epoxy resin E-51. The following reaction scheme is only an example and is not intended to limit the present invention. In the following example, the first step is the main reaction of the epoxy resin main agent with the curing agent when the mixture of them are placed at room temperature, and the second step is the main reaction when the mixture is heated to 40-85° C.:

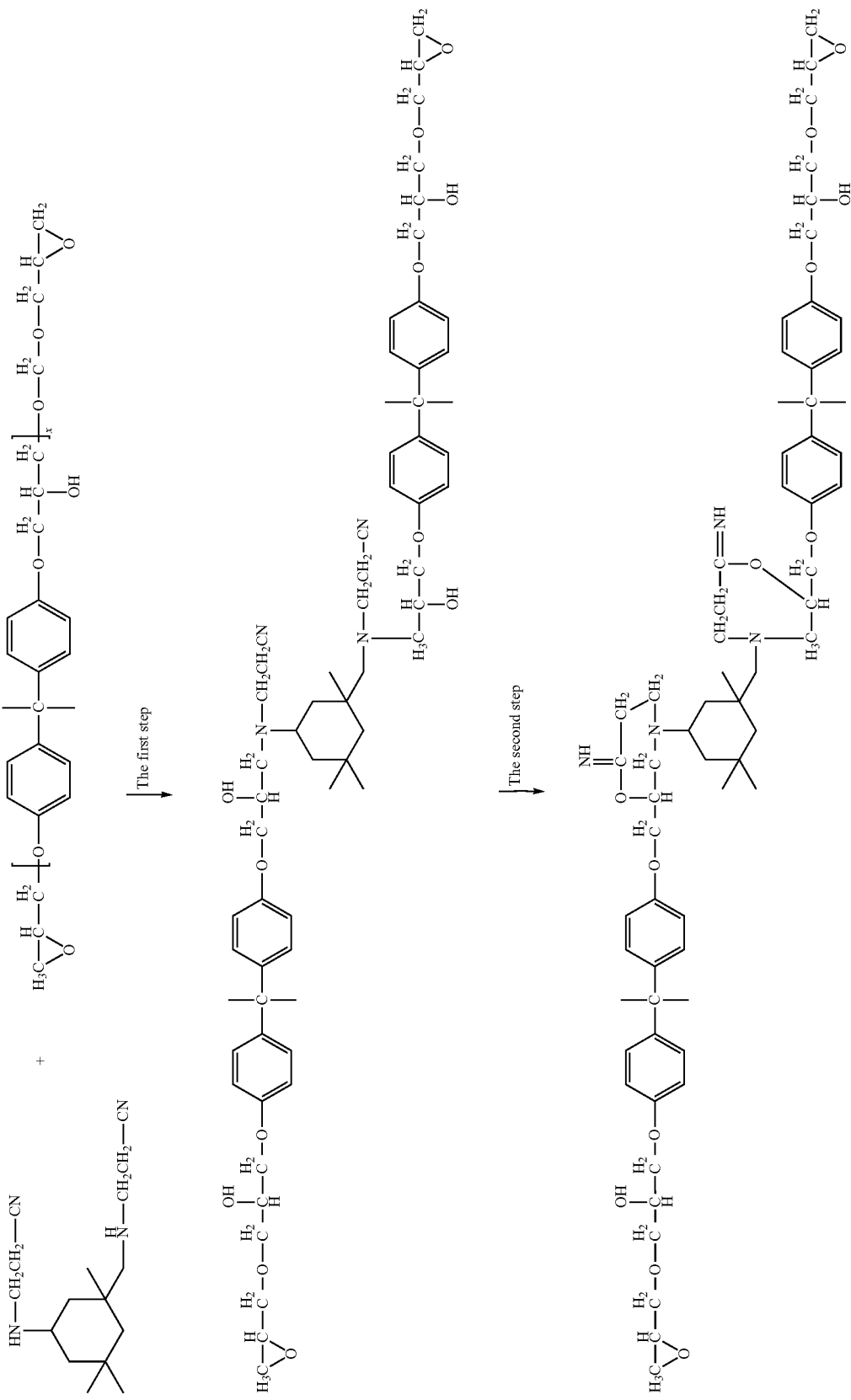

The second aspect of the present invention provides an epoxy resin material which is obtained by the above-described preparation method.

The third aspect of the present invention provides an application of the epoxy resin material described above; the epoxy resin material is applied to the preparation of large-scale composite materials, for example, it may be applied to the preparation of large-scale composite materials which are used or possibly used in the following fields: wind power blades, flue gas desulfurization tower, power transmission and transformation equipment, high pressure gas cylinder, automotive body, rail transit vehicle body, wings of civil aircraft, nose spinner, yacht, fishing vessel, reinforcing material for houses, tunnel project, large-scale warehouse and sporting goods, etc. More preferably, the epoxy resin material is applied to the preparation of wind power blades.

The large-scale composite material refers to the parts in which the epoxy resin composition is used in an amount of more than 1 ton during an once-forming process of the material.

The technical solution provided by the present invention has the following beneficial effects:

The epoxy resin material of the present invention can meet the construction process requirements of large-scale composite materials such as wind power blades by introducing —CN into the curing agent. Due to the strong electron withdrawing effect of CN, the electron cloud density on the amino group is lowered, and thus the reaction between the amino group and the epoxy group is inhibited during the curing reaction, thereby extending the pot life of the mixed system, reducing the maximum exothermic peak temperature and delaying the time when the exothermic peak appears. Due to the reduced sensitivity to the moisture and carbon dioxide in the air, the epoxy resin materials can flow more fully in the mold.

When the epoxy resin material is prepared by the solution of the present invention, the pot life can reach 3-6 h (100 g, 25° C.), the maximum exothermic peak temperature can be as low as 35-50° C., and the time when the maximum exothermic peak appears can be at 430-600 min which is delayed. In the present invention, the heat resistance, solvent resistance and mechanical properties of the cured product can be improved, by carrying out the reaction at a raised temperature after the mixture has been placed at room temperature. The epoxy resin material prepared in the present invention can have a Tg of 90-120° C., and in a preferred embodiment, the Tg can be 114° C. or more; and no significant changes can be observed in the epoxy resin material which is immersed in a hydrochloric acid with a concentration of 5% for 60-90 days; and in a preferred embodiment, no significant changes can be observed in the epoxy resin material which is immersed for 85 days or more; the tensile strength can reach 60-80 MPa, and in a preferred embodiment, it can reach 76 MPa or more.

The epoxy resin material prepared by the epoxy resin composition of the present invention can be applied to the preparation of large-scale wind power blades of 70-90 meters.

DETAILED DESCRIPTION

In order to better understand the technical solution of the present invention, the content of the present invention will be further elaborated in combination with embodiments below, but the content of the present invention is not only limited to the following embodiments.

The raw materials used in the following examples and sources thereof are shown in Table 1.

TABLE 1

| raw materials and sources thereof | |
|---|---|
| Chemical Name | Manufacturer |
| isophorone diamine (IPDA) | Wanhua Chemical Group Co., ltd. |
| diethylenetriamine (DETA) | Japan Tosoh Corporation |
| diphenylmethanediamine (MDA) | Wanhua Chemical Group Co., ltd. |
| polyether amine (D-230) | Huntsman Chemical |
| acrylonitrile | Sinopharm Chemical Reagent Co., Ltd |
| 3-butenenitrile | Sinopharm Chemical Reagent Co., Ltd |
| 3-pentenenitrile | Sinopharm Chemical Reagent Co., Ltd |
| 4-pentenenitrile | Sinopharm Chemical Reagent Co., Ltd |
| DER 331 | Dow Chemical |
| XY622 | Anhui Xinyuan Chemical Co., Ltd |

The viscosity that may be involved in the following examples was measured under the following test conditions: Brookfield viscometer was used, at a temperature of 25° C., with a 18 # rotor.

COMPARATIVE EXAMPLE 1

(1) Preparation of an Adduct of an Olefinic Nitrile Compound and an Amine Compound (Hereinafter Referred to as Adduct)

① The acrylonitrile was purified by using a rotary evaporator which was vacuumed with a water pump; the vacuum degree was −0.2 Mpa, and the temperature was 45° C.; the fraction having an acrylonitrile content of about 65 wt % was collected.

② 170 g of IPDA was added into a reactor, the reactor was purged with nitrogen and heated to 55° C.; under the action of 0.085 g triethylamine, 106 g of the fraction obtained from ① was added dropwise into the reactor; after the dropwise addition was completed, the reaction was carried out for 6 h and then the temperature was lowered to room temperature, and the adduct of the olefinic nitrile compound and the amine compound was obtained.

(2) Preparation of Epoxy Resin Material

Preparation of epoxy resin main agent: 70 g of DER 331 was added into a mixing equipment, and heated to 55° C. and then maintained at the same temperature; 15 g of XY622 and 15 g of BYKA530 (produced by BYK Chemical) were added and continuously stirred at 70° C. for 2.5 hours to be uniformly mixed and then the mixture obtained was left standing. Preparation of curing agent: 45 g of D-230 and 55 g of the adduct prepared in (1) were added into a reactor, and fully stirred for 1.5 hours to be uniformly mixed while the temperature of the reactor was maintained at 35° C.; the mixture obtained was then left standing for 1 hour; the obtained curing agent was placed in a product container, and then sealed and stored at room temperature;

The obtained epoxy resin main agent and curing agent were uniformly mixed at a mass ratio of 4:1; after being defoamed, the obtained mixture was poured into a mold, and placed at room temperature for 24 h to obtain the epoxy resin material.

For 100 g of the epoxy resin material prepared in Comparative Example 1, its pot life at 25° C. was 3 h, its maximum exothermic peak temperature was 50° C., and the time when the maximum exothermic peak appeared was at 430 min; the Tg of the cured product was 90° C.; and no significant changes were observed in the epoxy resin material which was immersed in 5% HCl for 60 days, and the tensile strength was 60 MPa.

EXAMPLE 1

(1) Preparation of an Adduct of an Olefinic Nitrile Compound and an Amine Compound (Hereinafter Referred to as Adduct)

① The acrylonitrile was purified by using a rotary evaporator which was vacuumed with a water pump; the vacuum degree was −0.2 Mpa, and the temperature was 45° C.; the fraction having an acrylonitrile content of about 65 wt % was collected;

② 170 g of IPDA was added into a reactor, the reactor was purged with nitrogen and heated to 55° C.; under the action of 0.085 g triethylamine, 106 g of the fraction obtained from ① was added dropwise into the reactor; after the dropwise addition was completed, the reaction was carried out for 6 h and then the temperature was lowered to room temperature, and the adduct was obtained.

(2) Preparation of Epoxy Resin Material

Preparation of epoxy resin main agent: 70 g of DER 331 was added into a mixing equipment, and heated to 55° C. and then maintained at the same temperature; 15 g of XY622 and 15 g of BYKA530 were added and continuously stirred at 70° C. for 2.5 hours to be uniformly mixed and then the mixture obtained was left standing;

Preparation of curing agent: 45 g of D-230 and 55 g of the adduct prepared in (1) were added into a reactor, and fully stirred for 1.5 hours to be uniformly mixed while the temperature of the reactor was maintained at 35° C.; the mixture obtained was then left standing for 1 hour; the obtained curing agent was placed in a product container, and then sealed and stored at room temperature;

The obtained epoxy resin main agent and curing agent were uniformly mixed at a mass ratio of 4:1; after being defoamed, the obtained mixture was poured into a mold, and placed at room temperature for 24 hours; then it was heated to 40° C. and reacted for 3 h to obtain the epoxy resin material.

For 100 g of the epoxy resin material prepared in Example 1, its pot life at 25° C. was 3 h, its maximum exothermic peak temperature was 50° C., and the time when the maximum exothermic peak appears was at 430 min; the Tg of the cured product was 102° C.; and no significant changes were observed in the epoxy resin material which was immersed in 5% HCl for 70 days, and the tensile strength was 71 MPa.

EXAMPLE 2

(1) Preparation of an Adduct of an Olefinic Nitrile Compound and an Amine Compound (Hereinafter Referred to as Adduct)

① The acrylonitrile was purified by using a rotary evaporator which was vacuumed with a water pump; the vacuum degree was −0.2 Mpa, and the temperature was 45° C.; the fraction having an acrylonitrile content of about 65 wt % was collected.

② 170 g of IPDA was added into a reactor, the reactor was purged with nitrogen and heated to 55° C.; in the presence of 0.085 g triethylamine, 106 g of the fraction obtained from ① was added dropwise into the reactor; after the dropwise addition was completed, the reaction was carried out for 6 h and then the temperature was lowered to room temperature, and the adduct was obtained.

(2) Preparation of Epoxy Resin Material

Preparation of epoxy resin main agent: 70 g of DER 331 was added into a mixing equipment, and heated to 55° C. and then maintained at the same temperature; 15 g of XY622 and 15 g of BYKA530 were added and continuously stirred at 70° C. for 2.5 hours to be uniformly mixed and then the mixture obtained was left standing;

Preparation of curing agent: 45 g of D-230 and 55 g of the adduct prepared in (1) were added into a reactor, and fully stirred for 1.5 hours to be uniformly mixed while the temperature of the reactor was maintained at 35° C.; the mixture obtained was then left standing for 1 hour; the obtained curing agent was placed in a product container, and then sealed and stored at room temperature.

The obtained epoxy resin main agent and curing agent were uniformly mixed at a mass ratio of 4:1; after being defoamed, the obtained mixture was poured into a mold, and placed at room temperature for 24 h; then it was heated to 85° C. and reacted for 7 h to obtain the epoxy resin material.

For 100 g of the epoxy resin material prepared in Example 2, its pot life at 25° C. was 3 h, its maximum exothermic peak temperature was 50° C., and the time when the maximum exothermic peak appears was at 430 min; the Tg of the cured product was 93° C.; and no significant changes were observed in the epoxy resin material which was immersed in 5% HCl for 62 days, and the tensile strength was 65 MPa.

EXAMPLE 3

(1) Preparation of an Adduct of an Olefinic Nitrile Compound and an Amine Compound (Hereinafter Referred to as Adduct)

① The 3-butenenitrile was purified by using a rotary evaporator which was vacuumed with a water pump; the vacuum degree was −0.2 Mpa, and the temperature was 45° C.; the fraction having an 3-butenenitrile content of about 65 wt % was collected;

② 103 g of DETA (diethylenetriamine) was added into a reactor, the reactor was purged with nitrogen and heated to 55° C.; under the catalysis of 0.26 g KOH, 201 g of the fraction obtained from ① was added dropwise into the reactor; after the dropwise addition was completed, the reaction was carried out for 6 h and then the temperature was lowered to room temperature, and the adduct was obtained.

(2) Preparation of Epoxy Resin Material

The preparation of epoxy resin main agent: 70 g of DER 331 was added into a mixing equipment, and heated to 55° C. and then maintained at the same temperature; 15 g of XY622 and 15 g of BYKA530 were added and continuously stirred at 70° C. for 2.5 hours to be uniformly mixed and then the mixture obtained was left standing.

Preparation of curing agent: 25 g of D-230 and 75 g of the adduct prepared in (1) were added into a reactor, and fully stirred for 1.5 hours to be uniformly mixed while the temperature of the reactor was maintained at 35° C.; the mixture obtained was then left standing for 1 hour; the obtained curing agent was placed in a product container, and then sealed and stored at room temperature.

The obtained epoxy resin main agent and curing agent were uniformly mixed at a mass ratio of 7:1; after being defoamed, the obtained mixture was poured into a mold, and placed at room temperature for 24 hours; then it was heated to 50° C. and reacted for 4 h to obtain the epoxy resin material.

For 100 g of the epoxy resin material prepared in Example 3, its pot life at 25° C. was 6 h, its maximum exothermic peak temperature was 35° C., and the time when the maximum exothermic peak appears was at 600 min; the Tg of the cured product was 120° C.; and no significant changes were observed in the epoxy resin material which was immersed in 5% HCl for 90 days, and the tensile strength was 80 MPa.

EXAMPLE 4

(1) Preparation of an Adduct of an Olefinic Nitrile Compound and an Amine Compound (Hereinafter Referred to as Adduct)

① The 4-pentenenitrile was purified by using a rotary evaporator which was vacuumed with a water pump; the vacuum degree was −0.2 Mpa, and the temperature was 45° C.; the fraction having an 4-pentenenitrile content of about 65 wt % was collected.

② 230 g of D-230 (polyether amine) was added into a reactor, the reactor was purged with nitrogen and heated to 55° C.; under the catalysis of 0.23 g hexahydropyridine, 243 g of the fraction obtained from ① was added dropwise into the reactor; after the dropwise addition was completed, the reaction was carried out for 6 h and then the temperature was lowered to room temperature, and the adduct was obtained.

(2) Preparation of Epoxy Resin Material

Preparation of epoxy resin main agent: 70 g of DER 331 was added into a mixing equipment, and heated to 55° C. and then maintained at the same temperature; 15 g of XY622 and 15 g of BYKA530 were added and continuously stirred at 70° C. for 2.5 hours to be uniformly mixed and then the mixture obtained was left standing;

Preparation of curing agent: 25 g of D-230 and 75 g of the adduct prepared in (1) were added into a reactor, and fully stirred for 1.5 hours to be uniformly mixed while the temperature of the reactor was maintained at 35° C.; the mixture obtained was then left standing for 1 hour; the obtained curing agent was placed in a product container, and then sealed and stored at room temperature.

The obtained epoxy resin main agent and curing agent were uniformly mixed at a mass ratio of 5:1; after being defoamed, the obtained mixture was poured into a mold, and placed at room temperature for 24 h; then it was heated to 80° C. and reacted for 7 h to obtain the epoxy resin material.

For 100 g of the epoxy resin material prepared in Example 4, its pot life at 25° C. was 4.7 h, its maximum exothermic peak temperature was 43° C., and the time when the maximum exothermic peak appears was at 520 min; the Tg of the cured product was 114° C.; and no significant changes were observed in the epoxy resin material which was immersed in 5% HCl for 85 days, and the tensile strength was 76 MPa.

In the above Examples 1-4, the adducts of an olefinic nitrile compound and an amine compound used may also be not prepared by the methods of the examples described-above, and may be existing raw materials that can be directly used and meet the same requirements, or may be commercially available.

During the preparation of the epoxy resin material in Comparative Example 1, it does not contain a step of reacting at a raised temperature, but only a step of placing at room temperature. Compared with examples which contain a subsequent reaction at a temperature raised to 40-85° C., the epoxy resin material prepared in Comparative Example 1 has a lower Tg value, a poor solvent resistance and tensile strength. In Examples 1 and 2, the temperatures for the reaction at a raised temperature were 40° C. and 85° C., respectively; compared with Examples 3-4 wherein the temperatures for the reaction at a raised temperature were 50-80° C., the solvent resistance, Tg value, and tensile strength of the products prepared in Examples 1 and 2 were inferior to those prepared in Examples 4-5. In addition, Examples 3-4 show a longer pot life, a higher exothermic temperature and also a greatly delayed time when the maximum exothermic peak appears.

Those skilled in the art would appreciate that many modifications or adjustments of the present invention can be made in the teachings of the present disclosure. Such modifications or adjustments should also be within the scope of the claims of the present invention.

The invention claimed is:

1. A preparation method of an epoxy resin material, characterized in that, said preparation method comprises the following step(s): heating a mixture placed at room temperature to 40-85° C. for reaction and curing, wherein said mixture comprises an epoxy resin main agent and a curing agent; and wherein said curing agent comprises an adduct of an olefinic nitrile compound and an amine compound;

wherein, said adduct of an olefinic nitrile compound and an amine compound is obtained by a method comprising the following steps: subjecting the amine compound and the olefinic nitrile compound to an addition reaction at 45-85° C.;

wherein, said addition reaction is carried out under the action of an alkaline catalyst, and the amount of the alkaline catalyst used is 0.01%-0.3% by mass of the amine compound.

2. The preparation method of an epoxy resin material according to claim 1, characterized in that, after said mixture is heated, the reaction is carried out for 3-7 h.

3. The preparation method of an epoxy resin material according to claim 1, characterized in that, before said mixture is heated for reaction and curing, said mixture is placed at room temperature for 24 h or more.

4. The preparation method of an epoxy resin material according to claim 1, characterized in that, said adduct of an olefinic nitrile compound and an amine compound comprises one or more of the compounds having the following structural formula (I):

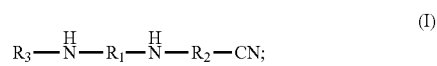

Wherein, the structural formula of $R_1$ in formula (I) is selected from one of the following formulas:

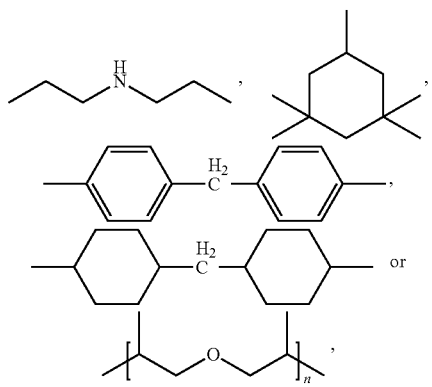

wherein the value of n is an integer from 1 to 6;
the structural formula of $R_2$ is selected from one of the following formulas:

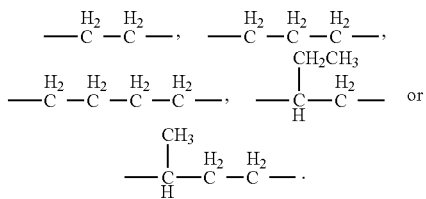

$R_3$ is selected from H or selected from one of the following structural formulas:

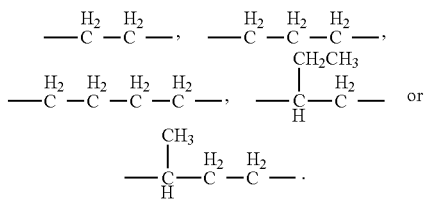

5. The preparation method of an epoxy resin material according to claim 1, characterized in that, said olefinic nitrile compound is one or more of acrylonitrile, 3-butenenitrile, 2-pentenenitrile, 3-pentenenitrile and 4-pentenenitrile;
said amine compound is one or more of diethylenetriamine, triethylenetetramine, polyether amine, 1,3-cyclohexyldimethylamine, isophorone diamine, 4,4'-diaminodicyclohexylmethane, diaminomethylcyclohexylmethane and diphenylmethanediamine.

6. The preparation method of an epoxy resin material according to claim 1, characterized in that, said adduct is obtained by an addition reaction of the amine compound and the olefinic nitrile compound-, wherein the molar ratio of the amine compound to the olefinic nitrile compound is 1:(1-4).

7. The preparation method of an epoxy resin material according to claim 1, characterized in that, the addition reaction is carried out for a period of 5-10 h.

8. The preparation method of an epoxy resin material according to claim 1, characterized in that, said olefinic nitrile compound has a purity of 50 wt % or more.

9. The preparation method of an epoxy resin material according to claim 8, characterized in that, said olefinic nitrile compound is obtained through purifying by a method comprising the following steps: distilling the olefinic nitrile compound under a vacuum degree of −0.5~−0.05 MPa, and at a temperature of 20~60° C.

10. The preparation method of an epoxy resin material according to claim 1, characterized in that, the mass ratio of said epoxy resin main agent to said curing agent is (3-8):1.

11. The preparation method of an epoxy resin material according to claim 1, characterized in that, said epoxy resin main agent comprises the following components in mass percentage: 60-80 wt % of epoxy resin, 2-20 wt % of diluent, and 1-20 wt% of defoamer, based on the mass of the epoxy resin main agent.

12. The preparation method of an epoxy resin material according to claim 11, characterized in that, said epoxy resin is one or more of a bisphenol A type epoxy resin and a bisphenol F type epoxy resin.

13. The preparation method of an epoxy resin material according to claim 12, characterized in that, said epoxy resin has an epoxy value of 0.1-0.65, and is a liquid at room temperature.

14. The preparation method of an epoxy resin material according to claim 11, characterized in that, said diluent is selected from one or more of butyl glycidyl ether, benzyl glycidyl ether, butanediol diglycidyl ether, 1,6-hexanediol diglycidyl ether, 1,2-cylohexanediol diglycidyl ether, poly (ethylene glycol) diglycidyl ether, trimethylolpropane triglycidyl ether, glycidyl ether having a molecular main chain comprising a C12-C14 alkyl, benzyl alcohol, phenylethanol, nonylphenol, propylene carbonate, trimethylolpropane triacrylate, diisopropanol methyl ether, toluene and xylene;
said defoamer is selected from one or more of a polyacrylate and a modified organosilicon.

15. The preparation method of an epoxy resin material according to claim 1, characterized in that, said curing agent comprises 55 wt %-75 wt % of the adduct of an olefinic nitrile compound and an amine compound, based on the total mass of the curing agent.

16. The preparation method of an epoxy resin material according to claim 15, characterized in that, said curing agent also comprises 25-45 wt % of polyether amine, based on the total mass of the curing agent.

17. The preparation method of an epoxy resin material according to claim 1, characterized in that, said mixture is heated to 50-80° C. for reaction and curing; after said mixture is heated, the reaction is carried out for 4-7 h.

18. The preparation method of an epoxy resin material according to claim 17, characterized in that, before said mixture is heated for reaction and curing, said mixture is placed at room temperature for 24 h or more.

19. The preparation method of an epoxy resin material according to claim 1, characterized in that, after the amine compound is heated to 45-85° C., the olefinic nitrile compound is added in a dropwise manner.

* * * * *